(12) United States Patent
Miao et al.

(10) Patent No.: US 11,763,468 B2
(45) Date of Patent: Sep. 19, 2023

(54) STRUCTURED LANDMARK DETECTION VIA TOPOLOGY-ADAPTING DEEP GRAPH LEARNING

(71) Applicant: Ping An Technology (Shenzhen) Co., Ltd., Shenzhen (CN)

(72) Inventors: Shun P Miao, Bethesda, MD (US); Weijian Li, Bethesda, MD (US); Yuhang Lu, Bethesda, MD (US); Kang Zheng, Bethesda, MD (US); Le Lu, Bethesda, MD (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 245 days.

(21) Appl. No.: 17/116,310

(22) Filed: Dec. 9, 2020

(65) Prior Publication Data

US 2023/0245329 A1    Aug. 3, 2023

Related U.S. Application Data

(60) Provisional application No. 62/988,713, filed on Mar. 12, 2020.

(51) Int. Cl.
*G06T 7/00* (2017.01)
*G06T 7/33* (2017.01)
(Continued)

(52) U.S. Cl.
CPC ............... *G06T 7/33* (2017.01); *G06T 7/11* (2017.01); *G06T 7/162* (2017.01); *G06T 2207/20072* (2013.01); *G06T 2207/20084* (2013.01)

(58) Field of Classification Search
CPC ........... G06T 7/0012; G06T 7/10; G06T 7/97; G06T 2207/30008; G06T 2207/30061;
(Continued)

(56) References Cited

U.S. PATENT DOCUMENTS

| 10,380,753 B1* | 8/2019 | Csordás | G06N 3/063 |
| 2015/0146990 A1* | 5/2015 | Uchiyama | G06V 10/50 |
| | | | 382/201 |

(Continued)

OTHER PUBLICATIONS

Schlichtkrull, M., Kipf, T.N., Bloem, P., van den Berg, R., Titov, I., Welling, M. (2018). Modeling Relational Data with Graph Convolutional Networks. In: , et al. The Semantic Web. ESWC 2018. Lecture Notes in Computer Science(), vol. 10843. Springer, Cham. (Year: 2018).*

*Primary Examiner* — Nay A Maung
*Assistant Examiner* — Vaisali Rao Koppolu
(74) *Attorney, Agent, or Firm* — ANOVA LAW GROUP, PLLC

(57) ABSTRACT

The present disclosure describes a computer-implemented method for image landmark detection. The method includes receiving an input image for the image landmark detection, generating a feature map for the input image via a convolutional neural network, initializing an initial graph based on the generated feature map, the initial graph representing initial landmarks of the input image, performing a global graph convolution of the initial graph to generate a global graph, where landmarks in the global graph move closer to target locations associated with the input image, and iteratively performing a local graph convolution of the global graph to generate a series of local graphs, where landmarks in the series of local graphs iteratively move further towards the target locations associated with the input image.

18 Claims, 7 Drawing Sheets

(51) Int. Cl.
*G06T 7/11* (2017.01)
*G06T 7/162* (2017.01)

(58) Field of Classification Search
CPC . G06T 2207/10072; G06T 2207/10116; G06T 2207/20081; G06T 2207/20084; G06T 7/12
See application file for complete search history.

(56) References Cited

U.S. PATENT DOCUMENTS

| | | | |
|---|---|---|---|
| 2019/0294970 A1* | 9/2019 | Fidler | G06K 9/6256 |
| 2020/0202514 A1* | 6/2020 | Yang | G06T 7/11 |
| 2020/0272806 A1* | 8/2020 | Walker | G06T 7/246 |
| 2020/0285944 A1* | 9/2020 | Lee | G06K 9/6267 |
| 2022/0358326 A1* | 11/2022 | Zhou | G06K 9/629 |

* cited by examiner

STRUCTURED LANDMARK DETECTION VIA TOPOLOGY-ADAPTING DEEP GRAPH LEARNING

CROSS-REFERENCE TO RELATED APPLICATIONS

This application claims the priority of U.S. Provisional Patent Application No. 62/988,713, filed on Mar. 12, 2020, the entire content of which is incorporated herein by reference.

THE FIELD OF THE DISCLOSURE

The present disclosure generally relates to the field of image processing and, more particularly, relates to methods, devices, and computer program products for structured landmark detection via topology-adapting deep graph learning.

BACKGROUND

Image landmark detection has been a fundamental step for many high-level computer vision tasks to extract and distill important visual contents, such as image registration, pose estimation, identity recognition, and image super-resolution. Robust and accurate landmark localization becomes a vital component in determining the success of the downstream tasks.

Recently, heatmap regression-based methods have achieved encouraging performance on landmark detection. These methods model landmark locations as heatmaps and train deep neural networks to regress the heatmaps. Despite popularity and success, these methods usually suffer from a major drawback of lacking a global representation for the structure and/or shape, which provides high-level and reliable cues in individual anatomical landmark localization. As a result, heatmap-based methods could make substantial errors when being exposed to large appearance variations, such as occlusions.

In contrast, coordinate regression-based methods have an innate potential to incorporate structural knowledge, since the landmark coordinates are directly expressed. Most existing methods initialize landmark coordinates using mean or canonical shapes, which indirectly inject weak structural knowledge. However, the exploitation of the structural knowledge in existing methods has still been insufficient as well as further exploitation of such structural knowledge, considering the underlying relationships between the landmarks. Effective means for information exchange among landmarks to facilitate landmark detection are also important but have yet to be explored. Due to these limitations, the performance of the latest coordinate-based methods even falls behind the error-prone heatmap-based methods.

Accordingly, there is a need for new approaches for more accurate and effective image landmark detection.

BRIEF SUMMARY OF THE DISCLOSURE

According to one aspect of the present disclosure, a computer-implemented method for image landmark detection is provided. The method includes receiving an input image for the image landmark detection, generating a feature map for the input image via a convolutional neural network, initializing an initial graph based on the generated feature map, the initial graph representing initial landmarks of the input image, performing a global graph convolution of the initial graph to generate a global graph, where landmarks in the global graph move closer to target locations associated with the input image, and iteratively performing a local graph convolution of the global graph to generate a series of local graphs, where landmarks in the series of local graphs iteratively move further towards the target locations associated with the input image.

According to another aspect of the present disclosure, a device for image landmark detection is provided. The device includes a processor and a non-transitory memory communicatively coupled to the processor. The memory contains computer programs that, when executed by the processor, cause the processor to implement operations that include receiving an input image for the image landmark detection, generating a feature map for the input image via a convolutional neural network, initializing an initial graph based on the generated feature map, the initial graph representing initial landmarks of the input image, performing a global graph convolution of the initial graph to generate a global graph, where landmarks in the global graph move closer to target locations associated with the input image, and iteratively performing a local graph convolution of the global graph to generate a series of local graphs, where landmarks in the series of local graphs iteratively move further towards the target locations associated with the input image.

According to yet another aspect of the present disclosure, a computer program product for image landmark detection is provided. The computer program product includes a non-transitory computer-readable storage medium and program instructions stored therein, where the program instructions are configured to be executable by a computer to cause the computer to perform operations including receiving an input image for the image landmark detection, generating a feature map for the input image via a convolutional neural network, initializing an initial graph based on the generated feature map, the initial graph representing initial landmarks of the input image, performing a global graph convolution of the initial graph to generate a global graph, where landmarks in the global graph move closer to target locations associated with the input image, and iteratively performing a local graph convolution of the global graph to generate a series of local graphs, where landmarks in the series of local graphs iteratively move further towards the target locations associated with the input image.

Other embodiments of one or more of these aspects and other aspects include corresponding apparatus, and computer programs, configured to perform the various actions and/or store various data described in association with these aspects. Numerous additional features may be included in these and various other embodiments, as discussed throughout this disclosure It should be understood that the language used in the present disclosure has been principally selected for readability and instructional purposes, and not to limit the scope of the subject matter disclosed herein.

BRIEF DESCRIPTION OF THE DRAWINGS

The accompanying drawings, which are incorporated in and constitute a part of the specification, illustrate various embodiments of the present disclosure and, together with the description, serve to explain the principles of the present disclosure.

DETAILED DESCRIPTION

Figure 1:
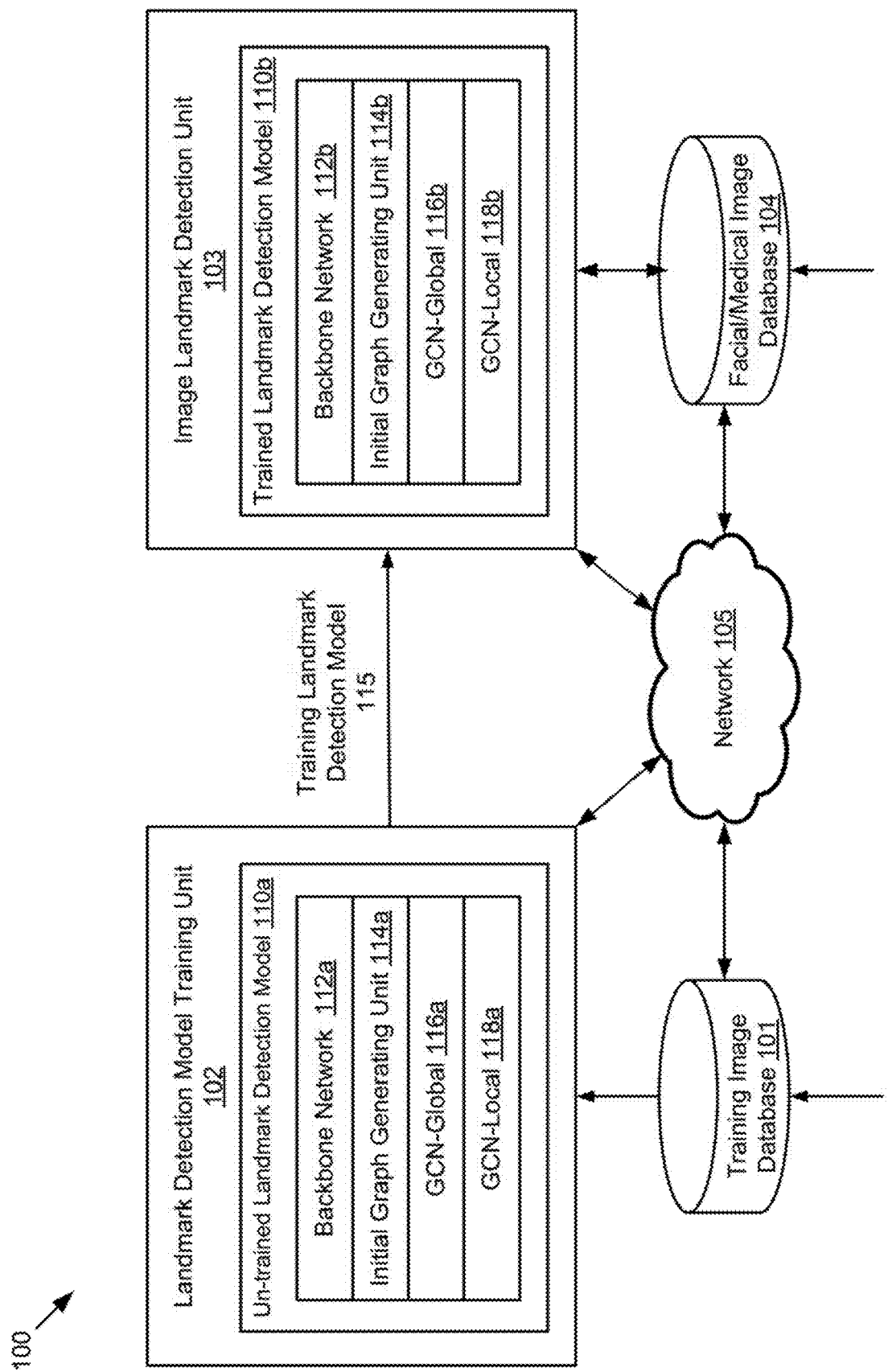
FIG. 1 illustrates an exemplary image landmark detection device, according to some embodiments of the present disclosure.

The figures and the following description relate to some embodiments by way of illustration only. It should be noted that from the following discussion, alternative embodiments of the structures and methods disclosed herein will be readily recognized as viable alternatives that may be employed without departing from the spirits and principles of the present disclosure.

Devices and methods consistent with the present disclosure are directed to a topology-adapting deep graph learning approach (which may be referred to as "Deep Adaptive Graph (DAG)") for effective and accurate anatomical facial and medical (e.g., hand, pelvis) landmark detection. The facial and medical landmarks render representations of faces or medical structures (e.g., hand, pelvis), portions of the faces or medical structures, for a computing machine (e.g., computer) to identify faces or medical structures or the portions of the faces or medical structures.

According to some embodiments of the present disclosure, the image (e.g., facial or medical image) landmark detection is obtained by modeling the landmarks as a graph and then employing global-to-local cascaded Graph Convolutional Networks (GCNs) to move the landmarks towards the target locations in multiple steps. Graph signals of the landmarks are built by combining local image features and graph shape features. Two GCNs operate in a cascaded manner, with the first GCN (may be referred to as "GCN-global") estimating a global transformation of the landmarks and the second GCN (may be referred to as "GCN-local") estimating local offsets to further adjust the landmark coordinates. The graph topology, represented by the connectivity weights between landmarks in a graph, is learned during the training phase.

By modeling landmarks as a graph and processing it with GCNs, the disclosed method is able to effectively exploit the structural knowledge and allows rich information exchange among landmarks for accurate coordinate estimation. The graph topology learned for a landmark detection task is capable of revealing reasonable landmark relationships for a given task. The disclosed model also reduces the need for manually defining landmark relations (or grouping), making the disclosed method to be easily adapted for different tasks. By incorporating shape features into graph signal in addition to the local image feature, the disclosed method can learn and exploit the landmark shape prior to achieve high robustness against large appearance variations (e.g., occlusions).

The disclosed method has obvious advantages compared to other existing landmark detection methods. First, by representing the landmarks as a graph and detecting these landmarks using GCNs, the disclosed method effectively exploits the structural knowledge for landmark coordinate regression, closes the performance gap between coordinate- and heatmap-based landmark detection methods. Second, the disclosed method automatically reveals physically meaningful relationships among landmarks, leading to a task-agnostic solution for exploiting structural knowledge via stepwise graph transformations. Third, the disclosed method combines both visual contextual information and spatial locational information into the graph signal, allowing structural shape prior to be learned and exploited. Other benefits and advantages become apparent to those skilled in the art upon reading the embodiments of the present disclosure.

Exemplary embodiments are now described with reference to the accompanying drawings. In the figures, the left-most digit(s) of a reference number identifies the figure in which the reference number first appears. Wherever convenient, the same reference numbers are used throughout the drawings to refer to the same or like parts.

FIG. 1 illustrates an exemplary image landmark detection device 100, according to some embodiments of the present disclosure. Image landmark detection device 100 may include a training image database 101, a landmark detection model training unit 102, an image landmark detection unit 103, a facial/medical image database 104, and a network 105. In some embodiments, image landmark detection device 100 may include more or fewer of the components shown in FIG. 1. For example, when a landmark detection model is pre-trained and provided, image landmark detection device 100 may only contain image landmark detection unit 103, facial/medical image database 104, and, optionally, network 105.

In some embodiments, the various components of image landmark detection device 100 may locate remotely from each other and be connected through network 105. In some alternative embodiments, certain components of image landmark detection device 100 may be located on the same site or inside one device. For example, training image database 101 may be located on-site with landmark detection model training unit 102, or be part of landmark detection model training unit 102. As another example, landmark detection model training unit 102 and image landmark detection unit 103 may be inside a same computer or image processing device.

As shown in FIG. 1, landmark detection model training unit 102 may communicate with training image database 101 to receive one or more training image datasets. The training image datasets stored in training image database 101 may be obtained from different sources, and may contain facial images or medical images, such as X-ray images. In some embodiments, the training images may be pre-treated, curated, or resized. For instance, some training facial images may be first cropped and/or resized into 256×256 based on the provided bounding boxes, some Cephalometric X-rays may be resized to 640×800, and some hand and pelvic X-rays may be resized into 512×512, preserving the original height and width ratio by padding zero values to the empty options. In some embodiments, the training images may be labelled for a certain number (e.g., 98, 68, etc.) of landmarks.

Consistent with the disclosed embodiments, the training images may also include medical images other than X-ray images, such as MRI images, 3D MRI, 2D streaming MRI, 4D volumetric MRI, CT images, CBCT images, Spiral CT images, PET images, functional MRI images (e.g., fMRI, DCE-MRI and diffusion MRI), fluoroscopic images, ultrasound images, radiotherapy portal images, SPECT images, and the like. In some embodiments, images other than the medical images and facial images may be also contemplated here, as long as certain landmarks may be recognized from these images.

Landmark detection model training unit 102 may be configured to use the training images received from training image database 101 to train a landmark detection model using learning algorithms. As shown in FIG. 1, landmark detection model training unit 102 may include an un-trained landmark detection module 110a, which itself may further include a backbone network 112a, an initial graph generating unit 114a, a GCN-global 116a, and a GCN-local 118a. Landmark detection model training unit 102 may additionally include input and output interfaces (not shown) to communicate with training image database 101 and network 105. Consistent with some embodiments, landmark detection model training unit 102 may be implemented with hardware (e.g., as disclosed in FIG. 2) specially programmed by software that performs a landmark detection model training process 115.

Backbone network 112a may be a Convolutional Neural Network (CNN) that can be trained to generate a feature map H for an input image through encoding the input image. In some embodiments, supervised deep learning and machine learning in the network may take data and results as input during training to generate the rules or data patterns. For instance, CNN may take a two-dimensional image and the class of the image, like a cat or a dog, as an input. As a result of the training, trained weights may be obtained, which are the data patterns or rules extracted from the images. Upon being trained, image may be the only input passed to the trained backbone network 112b, and the trained backbone network 112b will output the class of the image as a feature map. The class of the image or feature map will be based on the learned data patterns during the training. In some embodiments, backbone network 110a/110b may also include filters and feature detectors that can be applied to an input image to generate feature maps.

Initial graph generating unit 114a may be trained to initialize a graph for an input image, which is then further subjected to cascaded global-to-local graph convolution in landmark detection. The initialized graph may represent landmarks identified from an input image. For instance, the initial graph may include initial landmarks, denoted by V, which may be a shape of landmarks learned from a training set. The shape of landmarks learned from the training set may be placed in the center of the image, to acquire initial locations of the initial landmarks for the input image. In some embodiments, the initial graph may also take into consideration of certain shape and structural information from the feature amp generated for the input image, and thus may include graph signal, denoted by F, that captures appearance and shape information of the feature map. In some embodiments, the initial graph may further take into consideration the learned connectivity (denoted by E) with weights obtained through training. The learned connectivity may determine the relationship between each pair of landmarks in a graph and serves as the information exchange channel in GCN, as further described more in detail in FIGS. 3-5. Once an initial graph is generated for an input image, the initialized graph may be then subjected to the cascaded GCNs, including GCN-global and iterative GCN-local processing.

GCN-global 116a may be a graph convolutional network that, upon being trained to GCN-global 116b, may deform the initial graph, so as to move the initial landmarks closer to the target locations associated with the input image. For instance, GCN-global 116b may include a global transformation module that takes initial landmark locations as input and outputs a perspective transformation matrix for coarse alignment of landmarks. More details regarding the function of GCN-global 116a/116b in landmark detection, including its training process, may refer to the descriptions in FIGS. 3-5.

GCN-local 118a may be a graph convolutional network that, upon being trained to GCN-local 118b, may further adjust the landmarks, so as to move the landmarks even closer to the target locations associated with the input image. For instance, GCN-local 118b may include a local refinement module that takes existing landmark coordinates as input and outputs the coordinate shifts to update the landmark coordinates. As discussed elsewhere herein, multiple iterations may be performed by GCN-local 118b to precisely regress the landmark locations towards target locations associated with the input image. More details regarding the function of GCN-local 118a/118b in landmark detection, including its training process, may refer to the descriptions in FIGS. 3-5.

It is to be noted that while backbone network 112a/112b, initial graph generating unit 114a/114b, GCN-global 116a/116b, and GCN-local 118a/118b are illustrated in un-trained/trained landmark detection model 110a/110b in FIG. 1, the disclosed landmark detection module 110a/110b is not limited to these components or units. Other components or units that help create a robust and practical landmark detection device are also contemplated. After training through landmark detection model training process 115, trained landmark detection model 110b may be deployed into image landmark detection unit 103 for image landmark detection.

Image landmark detection unit 103 may receive trained landmark detection model 110b from landmark detection model training unit 102. As shown in FIG. 1, image landmark detection unit 103 may include trained landmark detection model 110b. Image landmark detection unit 103 may additionally include input and output interfaces (not shown) to communicate with facial/medical image database 104 and network 105. Consistent with some embodiments, image landmark detection unit 103 may be implemented with hardware (e.g., as disclosed in FIG. 2) specially programmed by software that performs an image landmark detection process.

Image landmark detection unit 103 may communicate with facial/medical image database 104 to receive one or more facial/medical images or other landmark-containing images. These images stored in facial/medical image database 104 may be obtained from any image sources (e.g., medical institutes or other resources). These facial/medical images are typically not landmark-labelled yet. Consistent with the disclosed embodiments, the facial/medical images may be acquired using various imaging modalities, include MRI, functional MRI, CT, CBCT, Spiral CT, PET, SPECT, X-ray, fluoroscopic imaging, ultrasound, and radiotherapy portal imaging, etc. In some embodiments, facial/medical image database 104 may be an integrated part of image landmark detection unit 103, or located on the same site of image landmark detection unit 103, such as in a radiotherapy treatment room. For specific detail regarding the performance of trained landmark detection model 110b, including its backbone network 112b, initial graph generating unit 114*b*, GCN-global 116*b,* and GCN-local 118*b,* may refer to descriptions with respect to FIGS. 3-5 in the following descriptions.

Network 105 may provide connections between any of the above-described components in image landmark detection device 100. For example, network 105 may be a local area network (LAN), a wireless network, a cloud computing environment (e.g., software as a service, platform as a service, infrastructure as a service), a client-server, a wide area network (WAN), and the like.

Figure 2:
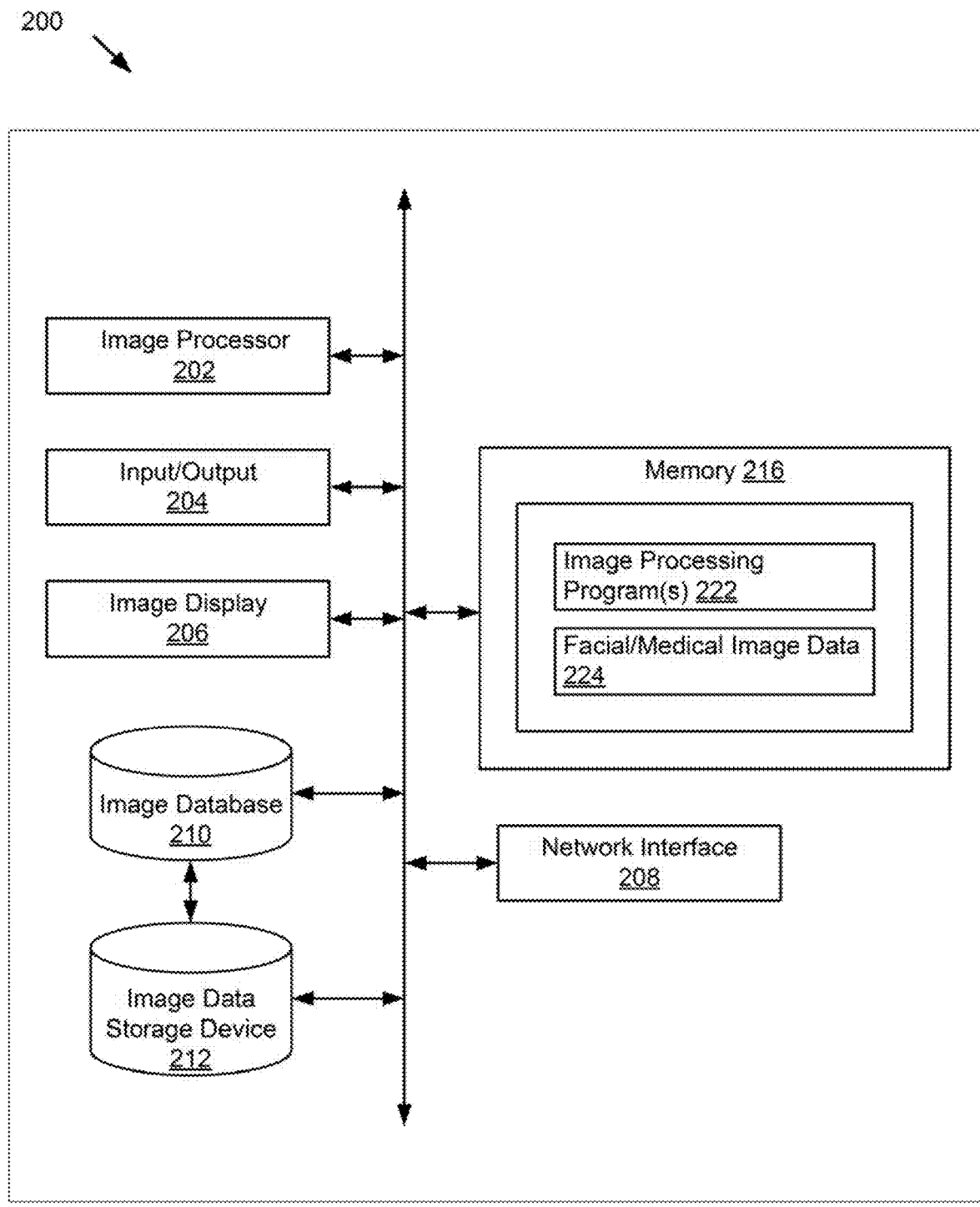
FIG. 2 illustrates an exemplary image processing device, according to some embodiments of the present disclosure.

Referring now to FIG. 2, an exemplary image processing device 200 is provided, according to some embodiments of the present disclosure. Image processing device 200 may be an embodiment of landmark detection model training unit 102, or image landmark detection unit 103, or a combination of the two. As would be appreciated by those skilled in the art, in some embodiments, image processing device 200 may be a special-purpose computer, or a general-purpose computer. In one example, image processing device 200 may be a computer custom built for hospitals to handle image acquisition and image processing tasks.

As shown in FIG. 2, image processing device 200 may include an image processor 202, an input/output 204, an image display 206, a network interface 208, an image database 210, an image data storage device 212, and a memory 216.

Image processor 202 may be a processing device, including one or more general-purpose processing devices such as a microprocessor, central processing unit (CPU), graphics processing unit (GPU), or the like. More particularly, image processor 202 may be a complex instruction set computing (CISC) microprocessor, reduced instruction set computing (RISC) microprocessor, very long instruction Word (VLIW) microprocessor, a processor implementing other instruction sets, or processors implementing a combination of instruction sets. Image processor 202 may also be one or more special-purpose processing devices such as an application specific integrated circuit (ASIC), a field programmable gate array (FPGA), a digital signal processor (DSP), a System on a Chip (SoC), or the like. According to some embodiments, image processor 202 may be an NVIDIA Titan V GPU.

Image processor 202 may be communicatively coupled to memory 216 and configured to execute the computer executable instructions or programs stored thereon. Memory 216 may include a Read-Only Memory (ROM), a flash memory, a Random-Access Memory (RAM), a static memory, a non-transitory memory, etc. In some embodiments, memory 216 may store computer executable instructions, such as one or more image processing programs 222, as well as data used or generated while executing image processing programs 222, such as facial/medical image data 224. Image processor 202 may execute image processing programs 222 to implement functionalities of landmark detection model training unit 102 and/or image landmark detection unit 103. Image processor 202 may also send/receive facial/medical image data 224 to/from memory 216. For example, image processor 202 may receive training facial image data or medical image data stored in memory 216. Image processor 202 may also generate intermediate data such as landmark features and send them to memory 216.

Image processing device 200 may optionally include an image database 210, which may include one or both of training image database 101 and facial/medical image database 104. One skilled in the art would appreciate that image database 210 may include a plurality of storage units located either in a central or distributed manner. Image processor 202 may communicate with mage database 210 to read images into memory 216 or store landmark detection images from memory 216 to image database 210.

Image data storage device 212 may be an additional storage available to store data associated with image processing tasks performed by image processor 202. In some embodiments, image data storage device 212 may include a machine-readable storage medium. While the machine-readable storage medium in an embodiment may be a single medium, the term "machine-readable storage medium" should be taken to include a single medium or multiple media (e.g., a centralized or distributed database, and/or associated caches and servers) that store the one or more sets of computer executable instructions or data. The term "machine-readable storage medium" shall also be taken to include any medium that is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical and magnetic media.

Input/output 204 may be configured to allow data to be received and/or transmitted by image processing device 200. Input/output 204 may include one or more digital and/or analog communication devices that allow image processing device 200 to communicate with user or other machines and devices. For example, input/output 204 may include a keyboard and a mouse for a user to provide input.

Image display 206 may be any display device that suitable for displaying the medical images or detected landmarks. For example, image display 206 may be an LCD, CRT, or LED display.

Network interface 208 may include a network adaptor, a cable connector, a serial connector, a USB connector, a parallel connector, a high-speed data transmission adaptor such as fiber, USB 2.0, thunderbolt, and the like, a wireless network adaptor such as a WiFi adaptor, a telecommunication (3G, 4G/LTE, and the like) adaptor, and the like. Image processing device 200 may be connected to network 105 through network interface 208.

Image processing programs 222 in memory 216 may include any programs that facilitate image processing. When implemented by image processor 202, image processing programs 222 may allow facial/medical images to be processed in image processing device 200. For instance, image processing programs 222 may include a landmark detection model 110*b* for detecting landmarks of facial/medical images with large variability. In some embodiments, image processing programs 222 may also include programs for training an un-trained landmark detection model 110*a*. Specific functions of these image processing programs 222 will be described hereinafter with reference to FIGS. 3-5.

Figure 3:
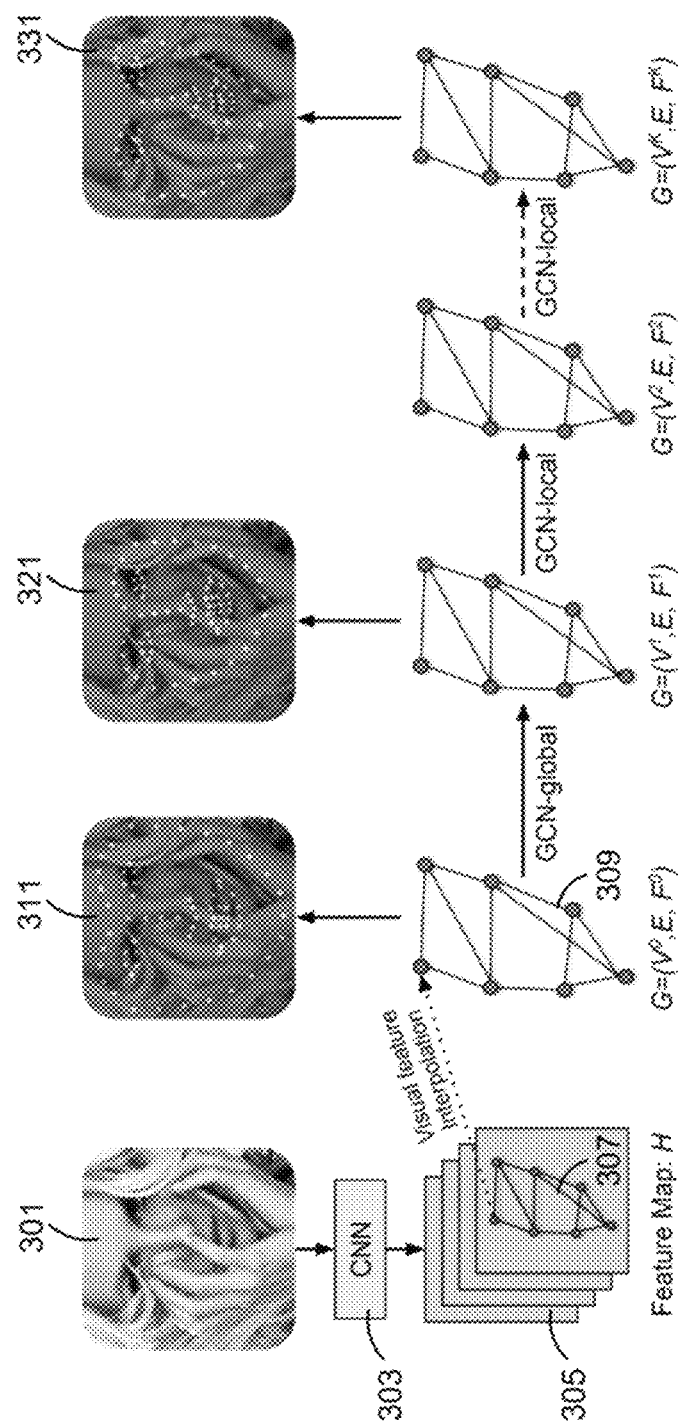
FIG. 3 illustrates an exemplary overview of a topology-adapting deep graph learning approach for landmark detection, according to some embodiments of the present disclosure.

FIG. 3 illustrates an exemplary overview of a topology-adapting deep graph learning approach for landmark detection, according to some embodiments of the present disclosure. Consistent with some embodiments, an input image 301 may be received by a landmark detection model (e.g., landmark detection model 110*b*). Input image 301 may be first processed by a backbone network 112*b* (e.g., a CNN encoder 303) as illustrated in the figure. Through processing by different layers 305 of backbone network 112*b*, a feature map 307 may be generated for input image 301. Through visual feature interpolation from feature map 307 and further shape feature calculation, graph signals may be obtained. These graph signals, when combined with initial landmarks obtained from training data and connectivity learned through the training process, may allow an initial graph 309 to be generated. As can be seen, initial landmarks in image 311 associated with the generated initial graph 309 are far from target locations (i.e., actual or expected landmark detections, which may be simply referred to as "targets"). Accordingly, initial graph 309 is further subjected to graph convolution through cascaded global-to-local GCNs, to move the landmarks towards the targets in multiple steps. For instance, through GCN-global, a global transformation of the landmarks may be obtained to coarsely move the landmarks close to the targets, as shown in image 321. Afterward, through GCN-local processing, local coordinate offsets of the landmarks may be obtained to iteratively move the landmarks towards the targets, as shown in image 331. The specific details regarding the topology-adapting deep graph learning approach for landmark detection will be provided hereinafter with reference to FIGS. 4-5.

Figure 4:
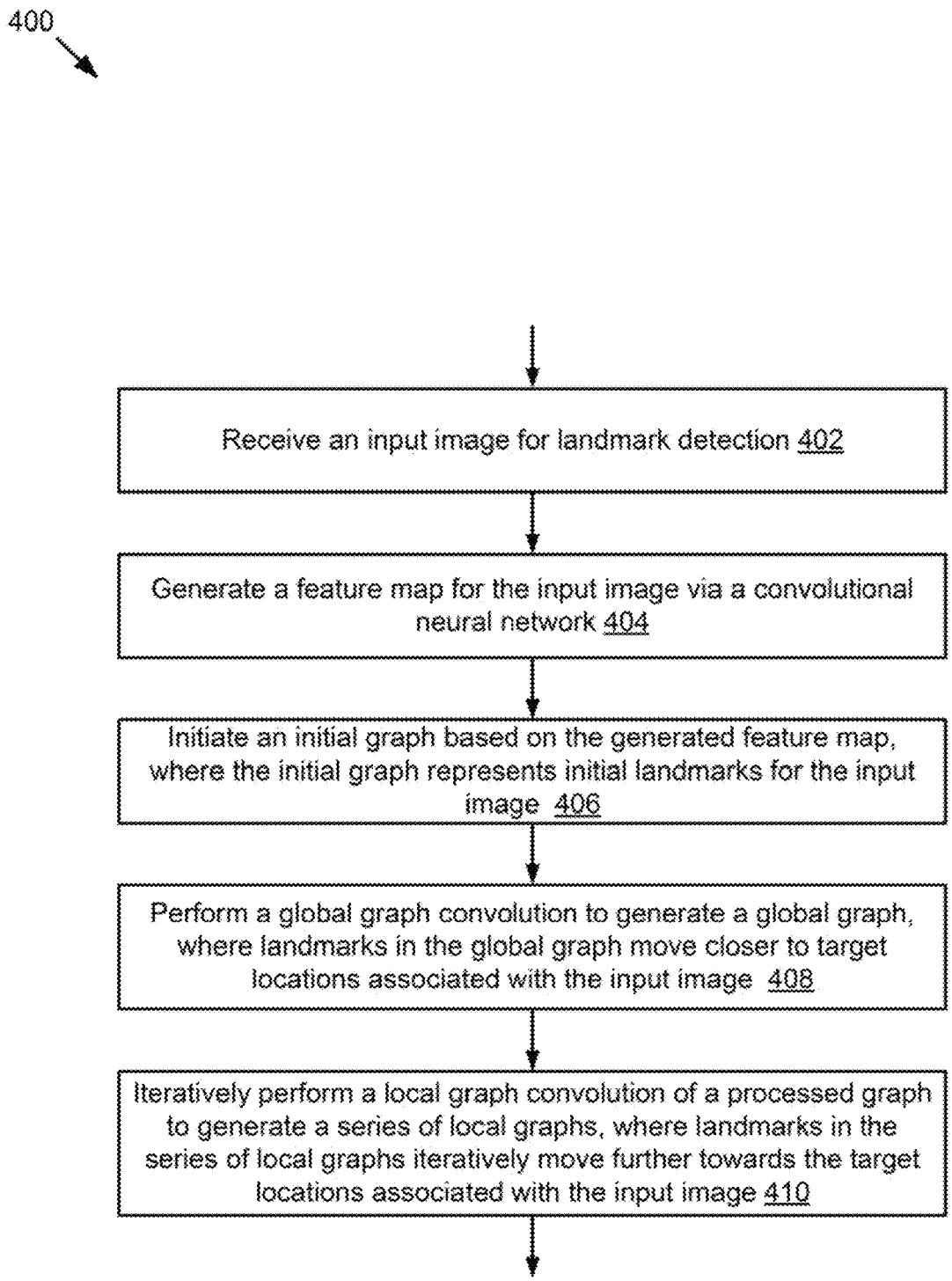
FIG. 4 is a flowchart illustrating an exemplary method for landmark detection, according to some embodiments of the present disclosure.

FIG. 4 is a flowchart illustrating an exemplary method 400 for landmark detection, according to some embodiments of the present disclosure. In some embodiments, landmark detection method 400 may be performed by image landmark detection unit 103 in an image processing device 200.

Consistent with the disclosed embodiments, method 400 may adopt a cascaded-regression framework, where given the input image and initial landmarks (from the mean shape from the training data), the predicted landmark coordinates are updated in multiple steps. For instance, a cascaded-regression framework with a graph representation of the landmarks may be applied. The graph representation of the landmarks may be denoted as G=(V, E, F), where V={$v_i$} denotes the landmarks including landmark locations, in a landmark graph, E={$e_{ij}$} denotes the learned connectivity between landmarks, and F={$f_i$} denotes graph signals capturing appearance and shape information of the landmarks. The graph is processed by cascaded GCNs to progressively update landmark coordinates. Details of the cascaded GCNs for landmark coordinate update will be described in detail hereinafter.

In Step 402, an input image for landmark detection is received, e.g., by image landmark detection unit 110b, or more specifically by backbone network 112b. The input image may be received from a user device, or image processing device, an online source, or from any other resources. The input image may be a facial image, a medical image, or any other images that contain landmarks that can be trained and/or detected. If a medical image is received, the image may be an X-ray image, a CT image, or any other type of medical image.

In Step 404, a feature map may be generated by a backbone network that received the input image. The feature map, denoted as H, may include a certain number of channels. The backbone network for generating the feature map may be a CNN network, such as HRNet, ResNet, Stacked Hourglass, among others. According to one embodiment, a HRNet pre-trained on ImageNet may be used as the backbone network to extract visual feature maps for its parallel multi-resolution fusion mechanism and deep network design which fits the need for both high resolution and semantic feature representation. The last output after fusion from HRNet may be extracted as a feature map with a certain dimension, for instance, a dimension of $H \in R^{256 \times 64 \times 64}$ or others.

In Step 406, an initial graph is initialized, which represents initial landmarks for the input image. The initial landmarks may take a mean shape of landmarks from training data. The initial graph may also take into consideration the graph signals and the learned connectivity, as discussed elsewhere herein.

In Step 408, a global graph convolution is performed to estimate a global transformation to generate a global graph, in which the landmarks are coarsely moved to the targets. The global graph convolution may be performed by a GCN, e.g., GCN-global 116b, to generate the global graph. In some embodiments, the global graph convolution may be considered as the mechanism of information collection among the neighborhoods. For instance, given the graph connectivity E learning from a training process and the graph feature F, the k-th graph convolution operation updates the i-th node feature $f_j$ by aggregating all node features weighted by the connectivity:

$$f^i_{k+1} W_1 f^i_k + \Sigma_j e_{ij} W_2 f^j_k \quad (1)$$

where $W_1$ and $W_2$ are learnable weight matrices, and the connectivity E, or {$e_{ij}$}, serves as pathways for information flow from one landmark to another.

To facilitate understanding the global convolution process, the specific details regarding the determination of graph connectivity for graph convolution may be first described here. Consistent with the disclosed embodiments, the graph connectivity E may determine the relationship between each pair of landmarks in a graph G and serves as the information exchange channel in GCN. In most existing applications of GCN, the graph connectivity is given based on the prior knowledge of the task. In the disclosed landmark detection method, it is non-trivial to manually define the optimal underlying graph connectivity for the learning task. Therefore, relying on hand-crafted graph connectivity would introduce a subjective element into the model, which could lead to sub-optimal performance. To address this limitation, task-specific graph connectivities may be learned during the training phase in an end-to-end manner, according to some embodiments. The connectivity weight $e_{ij}$ behaves as an information propagation gate in graph convolutions (Eqn. 1). Connectivity {$e_{ij}$}, represented as an adjacency matrix, may be treated as a learnable parameter that is trained with the network during the training phase. By training the network with a type of dataset of a specific task, the task-specific optimal graph connectivity may be obtained by optimizing the performance of the target landmark detection task, allowing the disclosed method to be applied to different landmark detection tasks without manual intervention.

In some embodiments, in structured landmark detection problems, the underlying relationship between the landmarks may remain the same for a given task, instead of varying across individual images. Therefore, the same connectivity may be shared across images on the same task. For this reason, the connectivity weights may be directly optimized during the training phase using the images for the given task, which may be then applied to the given task without further modification.

Returning back to graph convolution, specifically, for GCN-global to coarsely move the initial landmarks to the targets, considering that the initial graph G is more flexible that does not have to maintain the parallelism and respective ratios among the edges, the global transformation may be modeled using a perspective transformation, according to some embodiments. For instance, a perspective transformation may be parameterized by 9 scalars M=[a, b, c, d, e, f, g, h, i]$^T \in R^{9 \times 1}$ with the operation written as:

$$\begin{bmatrix} x' \\ x' \\ 1 \end{bmatrix} \cong \begin{bmatrix} rx' \\ ry' \\ r \end{bmatrix} = \begin{pmatrix} a & b & c \\ d & e & f \\ g & h & i \end{pmatrix} \begin{bmatrix} x \\ y \\ 1 \end{bmatrix} \quad (2)$$

In some embodiments, a Graph Isomorphism Network (GIN) may be employed to process the graph features $\{f^i_k\}$ produced by the GCN to output a 9-dimensional vector representing the perspective transformation:

$$f^G = MLP(CONCAT(READOUT(\{f^i_k \in G\})|k=0,1,\ldots K)) \quad (3)$$

where the READOUT operator sums the features from all the nodes in the graph G. The transformation matrix M is obtained by transforming and reshaping $f^G$ into a 3 by 3 matrix. This transformation matrix may be then applied on the initial landmark node coordinates to obtain the aligned landmark coordinates:

$$V^1 = \{v^1_i\} = \{Mv^0_i\} \quad (4)$$

Here, the aligned landmark coordinates (i.e., the landmarks after the transformation or the transformed landmarks) may represent the coarse movement of the initial landmarks to the targets.

In Step 410, a local graph convolution may be performed to generate a series of local graphs, and to estimate local landmark coordinate offsets to iteratively move the landmarks toward the targets. Given the transformed landmarks in the global graph from Step 408, a second graph convolution, i.e., GCN-local, may be applied to further shift the graph iteratively. In some embodiments, GCN-local may employ the same architecture as GCN-global, with a difference that the last layer produces a 2-dimensional vector for each landmark, representing the coordinate offset of the landmark. The updated landmark coordinates may be written as:

$$v^{t+1}_i = v^t_i + \Delta v^t_i \quad (5)$$

where $\Delta v^t_i = (\Delta x^t_i, \Delta y^t_i)$ is the output of the GCN-local at the t-th step. Here, the updated landmarks in each generated local graph may represent a closer movement to the targets after each iteration of GCN-local.

In some embodiments, three iterations of the GCN-local may be performed for the GCN-local. However, it is to be noted that the number of iterations is not limited to 3 but can be any other number. For instance, two, four, five, six, or any other number of GCN-local iterations may be performed, to continuously move landmarks to the targets, until the desired outcome is achieved.

It is to be noted that, in some embodiments, the GCN-local and the GCN-global may share the same architecture and the same learnable graph connectivity. However, the weights between GCN-global and GCN-local may not be shared, due to the different functions of the two networks in graph convolution.

It is also to be noted that, during cascaded global-to-local graph convolution, graph signals may be re-calculated after GCN-global and after each GCN-local iteration, so that the updated graph signal may be applied in the next convolution or next iteration. For specific details regarding the calculation or re-calculation of the graph signals, may refer to the description with reference to FIG. 5.

Figure 5:
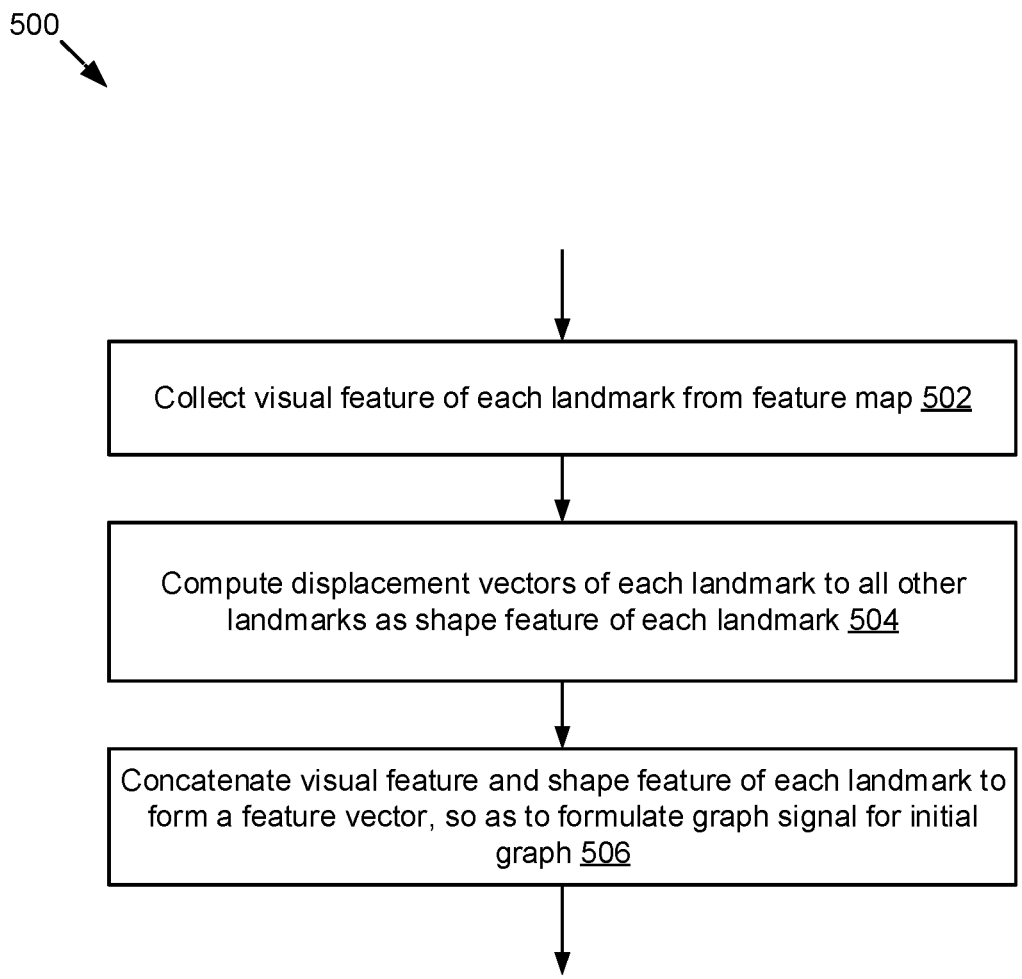
FIG. 5 is a flowchart illustrating an exemplary method for calculating a graph signal for a landmark in a graph, according to some embodiments of the present disclosure.

FIG. 5 is a flowchart illustrating an exemplary method 500 for calculating a graph signal F for a landmark in a graph, according to some embodiments of the present disclosure. The graph signal F may be formulated as a set of node features $f_i$, each associated with a landmark $v_i$. In some embodiments, the graph signal F may contain a visual feature to encode local image appearance and a shape feature to encode the global landmark shape.

Method 500 may start, in Step 502, by collecting visual feature of each landmark from the feature map. Specifically, visual features, denoted by $p_i \in R^D$, may be extracted by interpolating the feature map H at the landmark coordinates $v_i$. The interpolation may be performed via a differentiable bilinear interpolation. In this way, the visual feature of each landmark is collected from the feature map H, encoding the appearance of its neighborhood around each landmark.

In Step 504, displacement vectors of each landmark to all other landmarks may be computed, to incorporate global shape structure information into the graph signal. For instance, the displacement vectors, denoted as $q_i = \{v_i - v_i\}_{j \neq i} \in R^{2 \times (N-1)}$ may be applied, where N is the number of landmarks in the graph map. Such a shape feature allows structural information of the landmarks to be exploited to facilitate landmark detection. For example, when the mouth of a face is occluded, the coordinates of the mouth landmarks can be inferred from the eyes and nose, as can be seen from images in FIG. 6. Wrong landmark detection results that violate the shape prior can also be avoided when the shape is explicitly captured in the graph signal.

In Step 506, graph signal is constructed for each landmark by concatenating the visual feature $p_i$ and the shape feature $q_i$, resulting in a feature vector $f_i \in R^{D+2(N-1)}$. Accordingly, a set of node features $f_i$ may be generated, to formulate the graph signals F for the landmarks in the feature map H.

To allow each of Steps 402-410 to be performed properly, the described landmark detection model may be first trained before being applied to landmark detection method 400. Accordingly, a lost function may be first developed. Specifically, for GCN-global, since the perspective transformation estimated by GCN-global has a limited degree of freedom, directly penalizing the distance between the predicted and the ground truth landmarks may lead to unstable optimization behavior. As the goal of GCN-global is to coarsely locate the landmarks, it might be proper to use a margin loss on the L1 distance, written as:

$$L_{global} = \left[\left(\frac{1}{N}\sum_{i \in N}\sum_{x,y}|v^1_i - v_i|\right) - m\right]_+ \quad (6)$$

where $w[u]_+ := \max(0,u)$. $v^1_i = (x^1_i, y^1_i)$ and $v_i = (x_i, y_i)$ denote the predicted and ground truth landmark coordinates for the i-th landmark. m is a hyper-parameter representing a margin which controls how well the alignment is to be. Following this procedure, it is expected to obtain high robustness of the coarse landmark detection, while forgiving small errors.

With respect to GCN-local, to learn a precise localization, L1 loss may be employed on all predicted landmark coordinates after the GCN-local, written as:

$$L_{local} = \frac{1}{N}\sum_{i \in N}\sum_{x,y}|v^T_i - v_i| \quad (7)$$

where $v^T_i$ is the T-th step (the last step) coordinate predictions, and $\propto_i$ is the ground truth coordinate for the i-th landmark.

The overall loss function to train the landmark detection model may be then a combination of the above described two losses:

$$L = \lambda_1 L_{global} + \lambda_2 L_{local} \quad (8)$$

where $\lambda_k$ is the weight parameter for each loss. According to some embodiments, $\lambda_1 = \lambda_2 = 1$ may be chosen for different parts in the overall loss function.

In some embodiments, after defining the loss function, the landmark detection model 110a may be trained with image data from different tasks. The training may be an iterative process according to the overall loss function. After each iteration, the landmark detection model 110a may be then tested. In testing, the landmark detection model 110a may generate landmark detection information, which may be compared to the ground truth coordinates of all the landmarks.

In some embodiments, the landmark detection model 110a may be trained using a gradient-decent method or a back-propagation method, which gradually adjusts the network parameters to minimize the difference between the landmark detection and the ground-truth landmark information. The training may end upon at least one of the following conditions is satisfied: (1) training time exceeds a predetermined time length; (2) the number of iterations exceeds a predetermined iteration threshold; (3) the overall loss function output by the network is smaller than a predetermined loss threshold.

Consistent with the disclosed embodiments, once trained and parameterized, the trained landmark detection model 110b may be then evaluated for its efficiency and accuracy, as described in more detail hereinafter.

To evaluate the trained landmark detection model, image datasets representing different applications may be selected. In one implementation, six different datasets are selected for evaluation in the present disclosure, which includes three public facial image datasets and three medical image datasets: 1) WFLW dataset contains 7,500 facial images for training and 2,500 facial images for testing. The testing set is further divided into 6 subsets focusing on particular challenges in the images, namely large pose set, expression set, illumination set, makeup set, occlusion set, and blur set. 98 manually labeled landmarks are provided for each image. 2) 300 W dataset consists of 5 facial datasets namely LFPW, AFW, HELEN, XM2VTS, and IBUG. They are split into a training set with 3,148 images, and a testing set with 689 images where 554 images are from LFPW and HELEN, 135 from IBUG. Each image is labeled with 68 landmarks. 3) COFW dataset contains 1,345 facial images for training and 507 for testing, under different occlusion conditions. Each image is originally labeled with 29 landmarks and re-annotated with 68 landmarks. Inferences on the re-annotated COFW-68 dataset were conducted to test the model's cross-dataset performance which is trained on 300 W dataset. 4) Cephalometric X-ray is a public dataset originally for a challenge in IEEE ISBI-2015. It contains 400 X-ray Cephalometric images with a resolution of 1,935×2,400, 150 images are used as the training set, the rest 150 images and 100 images are used as the validation and test sets, respectively. Each cephalometric image contains 19 landmarks. Only the landmark detection task is focused here. 5) Hand X-ray is a real-world medical dataset collected by a hospital. The X-ray images are taken with different hand poses with resolutions in 1,500 s×2,000 s. In total, 471 images are randomly split into a training set (80%, N=378) and a testing set (20%, N=93). 30 landmarks are manually labeled for each image. 6) Pelvic X-ray is another real-world medical dataset collected by the same hospital as the Hand X-ray. Images are taken over the patient's pelvic bone with resolutions in 2,500 s×2,000 s. The challenges in this dataset is the high structural and appearance variation, caused by bone fractures and metal prosthesis. In total, 1,000 images are randomly split into a training set (80%, N=800) and a testing set (20%, N=200). 16 landmarks are manually labeled for each image.

In some embodiments, depending on the specific datasets, different evaluation metrics may be employed to evaluate the outcome of the trained landmark detection model 110b. For instance, for the above-described facial image datasets (i.e., WFLW dataset, 300 W dataset, COFW dataset), the widely adopted Normalized Mean Error (NME), Area Under the Curve (AUC), Failure Rate for a maximum error of 0.1 (FR@0.1), and Cumulative Errors Distribution (CED) curve may be employed. In some embodiments, to compare with other existing methods, both "inter-ocular" (outer-eye-corner-distance) and "inter-pupil" (eye-center-distance) normalizations may be conducted on the detected landmark coordinates. For another instance, for the above-described Cephalometric X-ray images, two sets of metrics may be compared instead, i.e., Mean Radial Error (MRE), which computes the average of Euclidean Distances (EDs) of predicted coordinates and ground truth coordinates of all the landmarks, and the corresponding Successful Detection Rate (SDR), which may be under 2 mm, 2.5 mm, 3 mm, 4 mm, and the like. On the other hand, for the Hand and Pelvic X-rays described above, MRE, Hausdorff Distance (HD), and Standard Deviations (STD) may be then computed. Hausdorff Distance may measure the maximum value of the minimum distances between two sets of points. For instance, the error upper-bound for the detected landmarks may be evaluated according to one embodiment.

Consistent with the disclosed embodiments, extensive quantitative and qualitative results may be obtained from the six datasets, which further validate that the disclosed landmark detection model 110b outperforms other existing approaches across the selected datasets in both measures of robustness and accuracy.

For the WFLW dataset, the disclosed landmark detection model 110b achieves 4.21% mean error, which outperforms other existing landmark detection models. Most significant improvements lie in make-up and occlusion subsets, where only partial landmarks are visible. The disclosed landmark detection model 110b is able to accurately infer those hard cases based on the visible landmarks due to the benefit of preserving and leveraging graph structural knowledge, as previously discussed.

For the 300 W dataset, the landmark detection model 110b achieves competitive results in both inter-pupil and inter-ocular normalizations comparing to the existing heatmap-based existing models. Comparing to existing coordinate-based models, the disclosed landmark detection model 110b achieves improvements in large margins (e.g., as high as 27%), which sets a remarkable milestone for coordinate-based models, closing the gap between coordinate- and heatmap-based methods.

In some embodiments, to verify the robustness and generalizability of the disclosed model, inference on images from COFW-68 dataset is conducted using the landmark detection model trained on the 300 W training set and validated on the 300 W full set. Results indicate that the landmark detection model's superior performance over other existing models, even for the COFW-68 dataset (which has improved 5% and 86% in Mean Error and FR@0.1) that is trained using 300 W dataset. This demonstrates strong cross-dataset generalizability of the disclosed landmark detection model 110b.

For the Cephalometric X-ray dataset, the disclosed model also significantly outperforms other existing models. For instance, the disclosed model 110b is able to achieve more precise localization under smaller error ranges, i.e., 2 mm and 2.5 mm.

For the Hand and Pelvic X-ray datasets, the disclosed model achieves substantial performance improvements comparing to other existing models on both datasets. On Hand X-ray, where the bone structure can vary in different shapes depending on the hand pose, the disclosed method still achieves largely reduced Hausdorff distance as well as its standard deviation, revealing landmark detection model's ability in capturing landmark relationships under various situations toward robust landmark detection.

As discussed above, quantitative results comparing with other existing approaches across all six datasets demonstrate the superior performance of the disclosed method in both robustness and accuracy. As further described in the following, qualitative visualizations of the learned graph topologies also demonstrate the superior performance of the disclosed landmark detection model in both robustness and accuracy.

Figure 6:
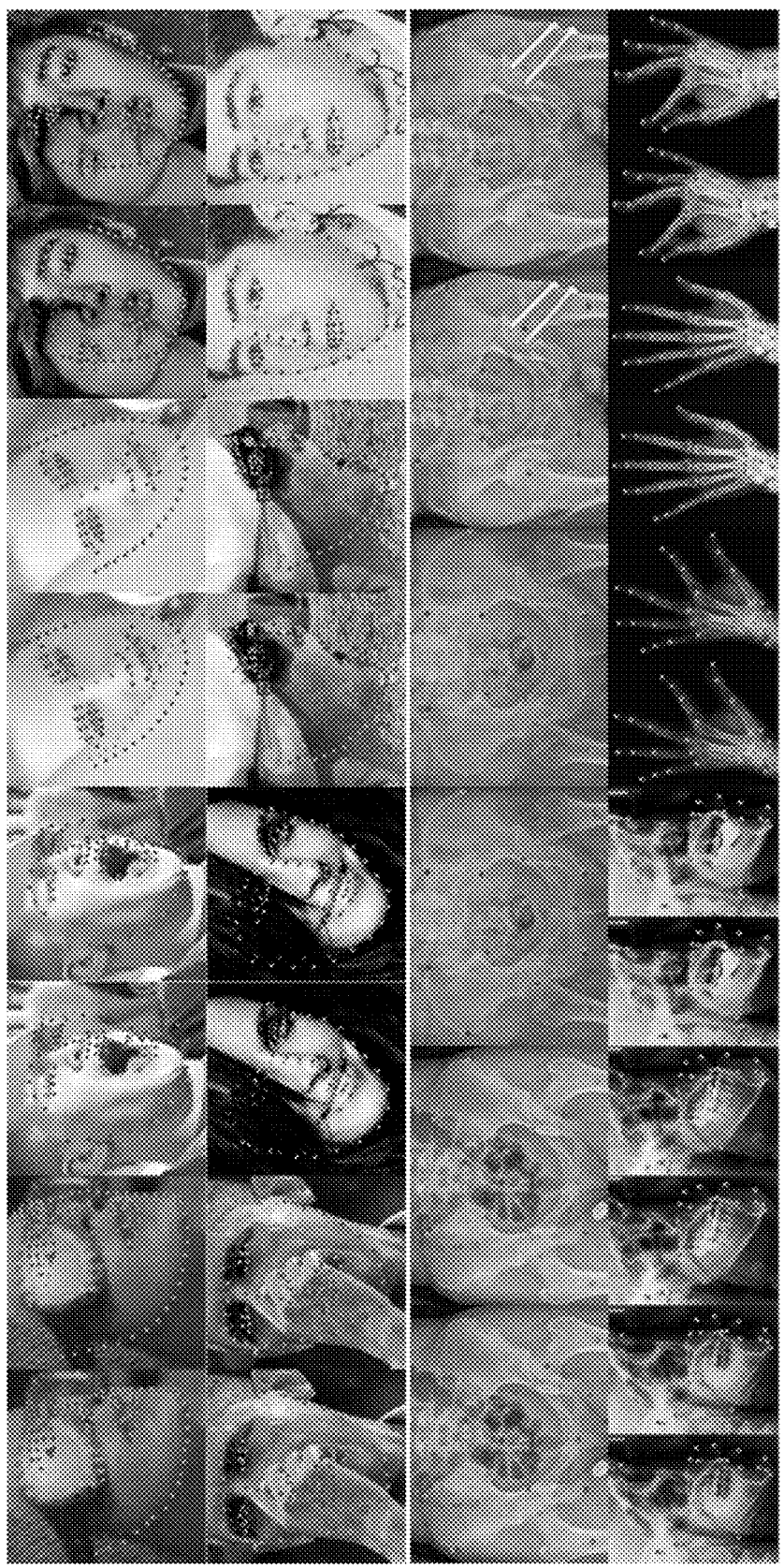
FIG. 6 illustrates an exemplary visualization of landmark detection results, according to some embodiments of the present disclosure.

FIG. 6 illustrates an exemplary visualization of landmark detection results, according to some embodiments of the present disclosure. In the figure, pairs of results are displayed side by side. For each pair, the left image represents a detection result from another existing method and the right image represents a detection result of the disclosed landmark detection model 110b. In each image, green dots represent landmark locations predicted by the corresponding method, and red dots represent ground truth landmark locations. From the figure, it can be seen that, among each pair of images, the right images generally have a more precise prediction of landmark locations when compared to the respective left images in the same pair. This becomes more obvious for facial images, especially for images with appearance variations, such as occlusions. This clearly demonstrates the efficiency and accuracy of the disclosed landmark detection model in landmark detection.

Figure 7:
FIG. 7 illustrates an exemplary graph structure visualization, according to some embodiments of the present disclosure.

In some embodiments, to better understand the learning outcomes of the disclosed landmark detection model 110b, the visualization on the learned graph structures may be further analyzed. FIG. 7 illustrates an exemplary graph structure visualization, according to some embodiments of the present disclosure. In the figure, red lines represent edges, green dots represent landmarks, and deeper red indicates higher edge weights. Among the six columns, the leftmost column represents the constructed graphs (3 highest weighted edges for each landmark), while the right 5 columns include the most related neighbors (10 highest weighted edges) for the 5 landmarks. From these images, it can be seen that the learned structures in different domains are meaningful, indicating strong connections between 1) spatially close landmarks, and 2) remote but related landmarks that move coherently, e.g. symmetrical body parts. The mechanism behind the algorithm of the disclosed method relies on these locations to provide reliable inductions when it makes movement predictions, such as similar movements by neighbors, or fixed spatial relationships by the symmetrical body parts (e.g., eyes, pelvis). With the learnable graph connectivity, the underlying landmarks relationships for different objects may be captured. This eventually leads to a task-agnostic solution for exploiting structural knowledge via step-wise graph transformations, which further justifies the efficiency and accuracy of the disclosed landmark detection model in the anatomical facial and medical (e.g., hand, pelvis) landmark detections.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer-readable storage medium may cause a machine to perform the functions or operations described, and includes any mechanism that stores information in a form accessible by a machine (e.g., computing device, electronic device/system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a device for performing the operations herein. The device may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

Embodiments of the present disclosure may be implemented with computer-executable instructions. The computer-executable instructions may be organized into one or more computer-executable components or modules. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

What is claimed is:

1. A computer-implemented method for image landmark detection, the method comprising:
   receiving an input image for the image landmark detection;
   generating a feature map for the input image via a convolutional neural network;
   initializing an initial graph based on the generated feature map, the initial graph representing initial landmarks of the input image;
   performing a global graph convolution of the initial graph to generate a global graph, wherein landmarks in the global graph move closer to target locations associated with the input image; and
   iteratively performing a local graph convolution of the global graph to generate a series of local graphs, wherein landmarks in the series of local graphs iteratively move further towards the target locations associated with the input image, wherein
      each graph, of the initial graph, the global graph, and the series of local graphs, is denoted by G=(V,E,F) for representing corresponding landmarks, wherein V denotes landmarks in each graph, E denotes connectivity between the landmarks, and F denotes graph signals capturing appearance and shape information of the landmarks in each graph,
      a same connectivity between landmarks is shared across the initial graph, the global graph, and the series of local graphs,
      the connectivity is directly trained during a training phase for capturing underlying relationships between landmarks, and
      each graph includes a graph structure, the graph structure at least including landmarks that are remotely located and coherently moved for symmetrical body parts.

2. The method of claim 1, wherein initializing the initial graph comprising:
   extracting a visual feature for each of the initial landmarks by interpolating the feature map at a corresponding landmark coordinate;
   determining a shape feature for each of the initial landmarks;
   constructing a graph signal for each of the initial landmarks by concatenating the visual feature and the shape feature for each of the initial landmarks; and
   incorporating the graph signal for each of the initial landmarks in initializing the initial graph.

3. The method of claim 2, wherein the interpolation is performed via a differentiable bi-linear interpolation.

4. The method of claim 1, wherein determining the shape feature for each of the initial landmarks comprises:
   computing displacement vectors of each of the initial landmarks to all other landmarks of the initial landmarks, and denoting the computed displacement vectors as the shape feature for each of the initial landmarks.

5. The method of claim 1, further comprising:
   after each of the global graph convolution and the local graph convolution, recalculating visual features and shape features to update graph signals for landmarks in each of the global graph and the iterative local graphs.

6. The method of claim 1, wherein initializing the initial graph comprises:
   initializing landmark locations using a mean shape of landmarks in a training set by placing the mean shape of landmarks at a center of the input image.

7. The method of claim 1, wherein performing the global graph convolution of the initial graph comprises:
   estimating a perspective transformation to move the initial landmarks closer to the target locations associated with the input image.

8. The method of claim 1, wherein iteratively performing the local graph convolution comprising:
   estimating local landmark coordinate offsets to iteratively move the landmarks in the series of local graphs towards the target locations associated with the input image.

9. The method of claim 1, wherein the global graph convolution and the local graph convolution employ a same graph convolutional network architecture.

10. The method of claim 9, wherein the global graph convolution and the local graph convolution share a same connectivity.

11. The method of claim 9, wherein the global graph convolution and the local graph convolution use different weights.

12. The method of claim 1, wherein a graph signal contains a visual feature to encode a local image appearance and a shape feature to encode a global landmark shape associated with each of the landmarks.

13. The method of claim 1, wherein the connectivity determines a relationship between each pair of landmarks in each graph, and serves as an information exchange channel in the global graph convolution and the local graph convolution.

14. The method of claim 1, further comprising:
   after each of the global graph convolution and the local graph convolution, recalculating visual features and shape features to update graph signals for landmarks in each of the global graph and the iterative local graphs.

15. A device for image landmark detection, comprising:
   a processor; and
   a memory communicatively coupled to the processor, the memory storing computer programs that, when executed by the processor, cause the processor to implement operations comprising:
      receiving an input image for the image landmark detection;
      generating a feature map for the input image via a convolutional neural network;
      initializing an initial graph based on the generated feature map, the initial graph representing initial landmarks of the input image;
      performing a global graph convolution of the initial graph to generate a global graph, wherein landmarks in the global graph move closer to target locations associated with the input image; and
      iteratively performing a local graph convolution of the global graph to generate a series of local graphs, wherein landmarks in the series of local graphs iteratively move further towards the target locations associated with the input image, wherein each graph, of the initial graph, the global graph, and the series of local graphs, is denoted by G=(V,E,F) for representing corresponding landmarks, wherein V denotes landmarks in each graph, E denotes connectivity between the landmarks, and F denotes graph signals capturing appearance and shape information of the landmarks in each graph, a same connectivity between landmarks is shared across the initial graph, the global graph, and the series of local graphs, the connectivity is directly trained during a training phase for capturing underlying relationships between landmarks, and each graph includes a graph structure, the graph structure at least including landmarks that are remotely located and coherently moved for symmetrical body parts.

16. The device of claim 15, wherein initializing the initial graph comprising:

extracting a visual feature for each of the initial landmarks by interpolating the feature map at a corresponding landmark coordinate;

determining a shape feature for each of the initial landmarks;

constructing a graph signal for each of the initial landmarks by concatenating the visual feature and the shape feature for each of the initial landmarks; and incorporating the graph signal for each of the initial landmarks in initializing the initial graph.

17. The device of claim 15, the operations further comprising:

after each of the global graph convolution and the local graph convolution, recalculating visual features and shape features to update graph signals for landmarks in each of the global graph and the iterative local graphs.

18. A computer program product comprising a non-transitory computer-readable storage medium and program instructions stored therein, the program instructions being configured to be executable by a computer to cause the computer to implement operations comprising:

receiving an input image for the image landmark detection;

generating a feature map for the input image via a convolutional neural network;

initializing an initial graph based on the generated feature map, the initial graph representing initial landmarks of the input image;

performing a global graph convolution of the initial graph to generate a global graph, wherein landmarks in the global graph move closer to target locations associated with the input image; and iteratively performing a local graph convolution of the global graph to generate a series of local graphs, wherein landmarks in the series of local graphs iteratively move further towards the target locations associated with the input image, wherein each graph, of the initial graph, the global graph, and the series of local graphs, is denoted by G=(V,E,F) for representing corresponding landmarks, wherein V denotes landmarks in each graph, E denotes connectivity between the landmarks, and F denotes graph signals capturing appearance and shape information of the landmarks in each graph, a same connectivity between landmarks is shared across the initial graph, the global graph, and the series of local graphs, the connectivity is directly trained during a training phase for capturing underlying relationships between landmarks, and each graph includes a graph structure, the graph structure at least including landmarks that are remotely located and coherently moved for symmetrical body parts.

\* \* \* \* \*